United States Patent [19]
Hope et al.

[11] 3,952,610
[45] Apr. 27, 1976

[54] GEAR SYSTEM

[76] Inventors: Henry F. Hope; Stephen F. Hope, both of 2548 Wyandotte Road, Willow Grove, Pa. 19090

[22] Filed: Oct. 9, 1974

[21] Appl. No.: 513,244

Related U.S. Application Data

[63] Continuation-in-part of Ser. No. 457,829, April 4, 1974, abandoned.

[52] U.S. Cl. .............................................. 74/421 R
[51] Int. Cl.[2] ......................... F16H 1/12; F16H 1/20
[58] Field of Search........... 74/421 R; 101/216, 181, 101/183

[56] References Cited

UNITED STATES PATENTS

| | | | |
|---|---|---|---|
| 3,151,502 | 10/1964 | Kron et al. | 74/421 R |
| 3,841,216 | 10/1974 | Huffman | 101/181 |
| 3,847,079 | 11/1974 | Dahlgren | 101/216 X |

*Primary Examiner*—Leonard H. Gerin
*Attorney, Agent, or Firm*—Weiser, Stapler & Spivak

[57] ABSTRACT

An improved gear system of greater efficiency having less bearing loading and less power requirement to rotate long gear trains. The system includes a plurality of large power gears serially mounted which receive rotative force from another power gear, the power gears positioned to turn respective power gear shafts. The power gear shaft transmits rotative forces to a drive gear which is smaller in diameter with respect to the power gear which drives it. The drive gear powers an individual satellite gear system of driven gears which drive a plurality of work producing satellite shafts. The large power gear in turn drive a downwardly positioned, similar, large power gear which in turn powers its own satellite gear train. In this manner the load of rotating the work producing shafts into a plurality of individual systems is broken up.

39 Claims, 13 Drawing Figures

200
202
204
206
208
210
212
214
216
218
220
222
224
226
228
230
270
282
283
284
285
286
287
288
290
292
294
296
297
298
299
300
301
302
303
304
305
306
308
309
310
311
312
313
314
315
316
317
318
319
320
321
322
323
324
326
328
330

GEAR SYSTEM

BACKGROUND OF THE INVENTION

This application is a continuation in part of Ser. No. 457,829, filed Apr. 4, 1974, now abandoned.

The present invention relates generally to the field of gear trains, and more particularly, is directed to a novel gear drive for rotating work producing shafts.

Gear drives in accordance with the present invention may be employed in a wide variety of applications wherein it is necessary or desirable to rotate a plurality of shafts. The gear system can be utilized to turn rollers, such as used in web transporting systems, to turn shafts in mixers, to power rack assemblies for use in film developing equipment and any other power transfer equipment to provide an efficient means to transfer power between the input and the output.

The present invention is equally applicable, self-contained, automatic film development equipment and to other types of devices wherein elongate webs of sheet material are fed through the equipment by employing a plurality of powered rollers. Automatic film developing equipment requires the use of various chemical containing tanks and film driving roller assemblies positioned within the tanks to lead the film automatically through the equipment during the complete developing process.

Such roller assemblies conventionally include a large number of driving and driven rollers which are designed for operation within a relatively narrow, relatively high processing tank. Due to the configuration of the chemical containing tanks, the roller assemblies as previously developed contain a pluraity of rollers which are vertically positioned relative to each other and which are usually driven by means of an elongated gear train or belt drive construction which extends substantially throughout the entire height of the rack. Because of the number of rollers involved and the fact that usually only a single drive gear is employed to simultaneously function all of the rollers, it has been found that the number of rollers to be functioned has resulted in many gears in direct sequential mesh.

The usual film processing rack assembly generally employs a great number of small gears, for example, one inch and two inches in diameter in direct sequential mesh. Many of the gears serve the dual functions of rotating a roller shaft and also of transmitting rotative forces to gears (and rollers) further down the gear train. The individual roller load at each gear is of course far smaller than the gear train load from succeeding gears and rollers. This large number of gears together with the vertical positioning of the gears requires unusually large power input to function the prior art systems. Because of the power required, the presently designed, sequential gear drive systems have proven to be subject to undue gear wear, to unusually rapid bearing or bushing wear and to the development of chatter or vibration within the gear drive system itself. All of these problems have combined to render the prior art types of gear trains relatively expensive in operation both from the maintenance view point and also from the cost of operation when considering power input requirements. Because of the problems inherent in presently designed systems, in the case of film processing racks, thirty inches in height has proved to be the limit of practical application of the sequential gear drive systems.

SUMMARY OF THE INVENTION

The present invention relates generally to the field of gear trains, and more particularly, is directed to a gear drive including a combination of sequential large power gears, which serve to divide the load into a plurality of individual load carrying components.

The present invention includes at least one side carrier within which are journalled a plurality of large power gears in sequential mesh. A drive gear meshes with the uppermost large power gear at the side carrier to rotate an upper power shaft. The upper power shaft extends outwardly of the side carrier to rotate an upper small power gear simultaneously with the large power gear. The upper small power gear meshes with an upper satellite gear system to rotate a work producing shaft in unison. The upper large power gear also serially drives one or more lower positioned, similar large power gear at the same speed. Each lower positioned power gear in turn powers a separate satellite driven gear system to rotate a separate group of work producing shafts. Additional, lower positioned, large power gears with individual satellite gear systems can be employed by having the large power gear in mesh with the next vertically above positioned large power gear. In this manner, a load can be broken into a plurality of individual satellite systems.

The large power gears are sizes as large as possible and are vertically, serially positioned on a side carrier. The large power gears are employed for satellite gear train power purposes and for powering the next positioned large power gear. Each large power gear powers its own satellite gear system through its power shaft and gearing mounted on a side carrier. The satellite gears receive power to rotate the individual shafts and function rotate rollers or other work producers and not to transmit gear train loads to other parts of the system. The satellite gears are preferably sized and positioned according to a desired work pattern and are disposed in gear clusters that impose largely balanced forces and provide a plurality of very short satellite power trains.

Surprisingly, it has been found that by vertically arranging the large power gears in serial mesh adjacent one side carrier and having each large power gear rotate an individual satellite gear system through its power shaft, the power requirements to drive the entire work producing system can be greatly reduced over previous gear drive systems. accommodating the same number of gears. In one embodiment, the large power gears have a diameter of 5 inches and the satellite gears are fabricated to a diameter of 1 inch. The five to one reduction results in greatly reducing the transmitted gear vibration. In the case of film developing rack assemblies, this produces the resultant benefit of less marking of the film emulsion. The gear drive system design of the present invention results in reducing chatter and in reducing friction within the system to thereby provide a gear drive that operates with less power and with greater efficiency than any previously developed gear drive system.

The large diameter power gears act to overcome bearing friction to facilitate system multiple shaft rotation with greatly reduced power requirements. By breaking up the gear system into a plurality of minor systems, a plurality of short gear trains are provided. The short gears systems are characterized in having less gear inefficiency. The short gear trains further produce less compounding of leverages and less bearing loading, thereby making it possible to drive the composite systems with less power. Because of the present configuration, the power gears, their bushings, etc. are capable of long life operation. Because each satellite gear carries little load, long life and reduced wear are also characteristic of the satellite gearing and the associated bushings. As compared to prior art web transporting racks as used in the film developing industry, for example, all gears now carry far reduced loads.

The small power gear of each individual satellite gear cluster meshes with an upper and lower intermediate driven gear. Each intermediate driven gear in turn meshes with a pair of diametrically opposed small gears to provide a reduction ration, for example, a five to one ratio. The geometry of each satellite gear cluster preferably produces a balanced bearing loading on the bearings within each cluster in a manner whereby the pressures are applied at the bearings as balanced forces, which act at 180° apart.

It is therefore an object of the present invention to provide an improved gear drive system of the type set forth.

It is another object of the present invention to provide a novel gear drive that incorporates means to reduce the power requirements within the system.

It is another object of the present invention to provide a novel gear drive for use with work producing equipment which includes a gear system capable of breaking the drive load into a plurality of increments.

It is another object of the present invention to provide a novel gear drive system for use with work producing equipment including a plurality of vertically positioned large power gears, each large power gear receiving its power from the large power gear immediately above and in turn transmitting its power to an individual satellite group of driven gears.

It is another object of the present invention to provide a novel gear drive which includes a pair of opposed right and left side carriers, the right side carrier being equipped with a plurality of similar, vertically spaced, large power drive gears, each large power drive gear transmitting power to the left side carrier through a power shaft wherein a plurality of satellite gear systems are individually responsive to power supplied by one of the large power gears.

It is another object of the present invention to provide a novel gear drive system which includes a plurality of vertically spaced power drive increments, each power drive increment including a large power gear, said large power gear rotating a laterally positioned small drive gear and each small drive gear driving a plurality of driven gears for shaft rotational purposes.

It is another object of the present invention to provide a novel gear drive system that is simple in design, inexpensive in manufacture and trouble free when in use.

Other objects and a fuller understanding of the invention will be had by referring to the following description and claims of the preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figures 1, 1A, 1B, 1C, 1D:
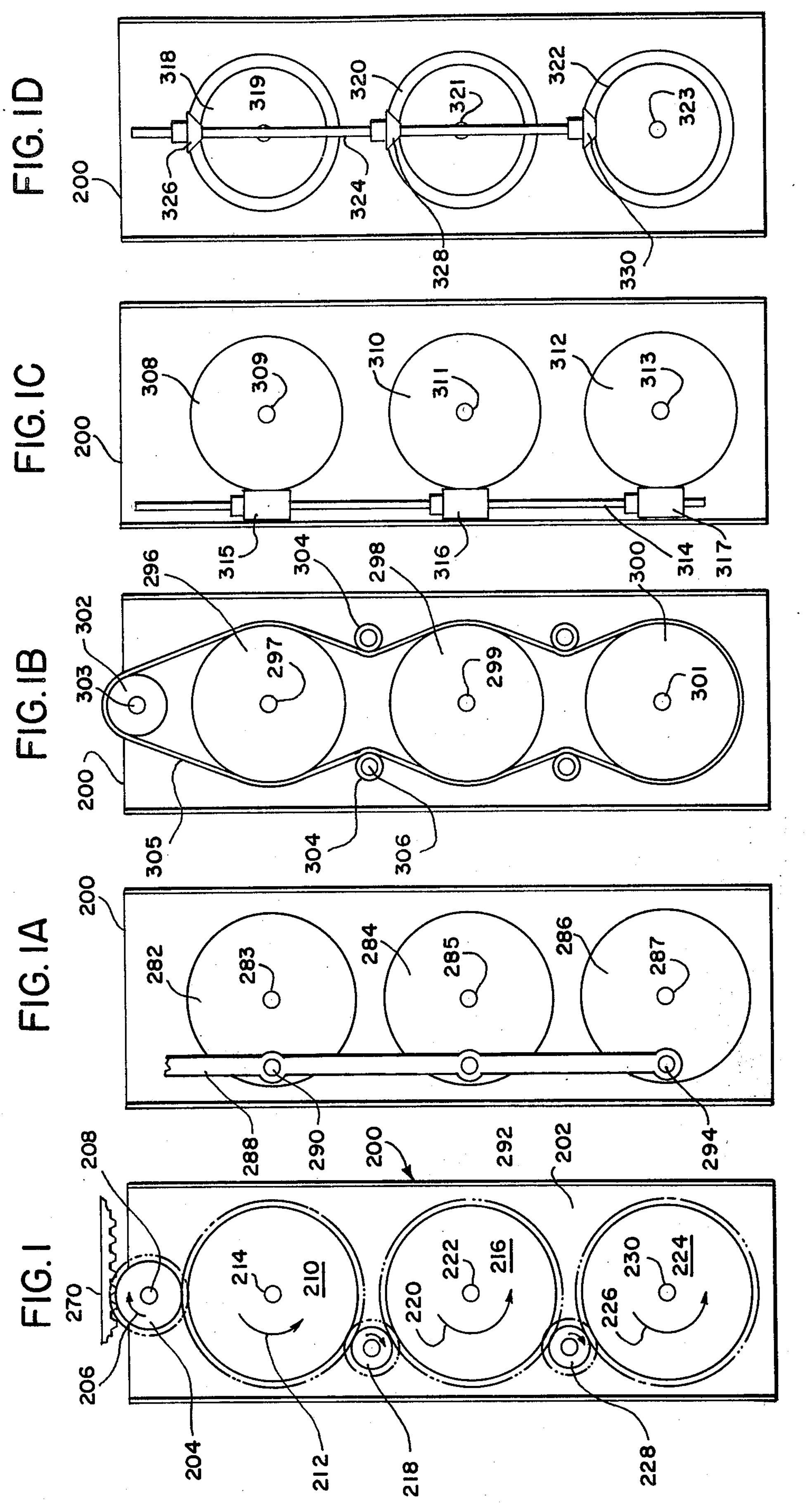
FIG. 1 is a front elevational view of a gear system arranged in accordance with the present invention.
FIG. 1A is a front elevational view similar to FIG. 1 showing a modification employing an accentric drive.
FIG. 1B is a front elevational view similar to FIG. 1 showing a modification employing a chain or belt drive.
FIG. 1C is a front elevational view similar to FIG. 1 showing a modification employing a worm drive.
FIG. 1D is a front elevational view similar to FIG. 1 showing a modification employing a bevel gear drive.

Although specific terms are used in the following description for the sake of clarity, these terms are intended to refer only to the particular structure of our invention selected for illustration in the drawings and are not intended to define or limit the scope of the invention.

Figure 3:
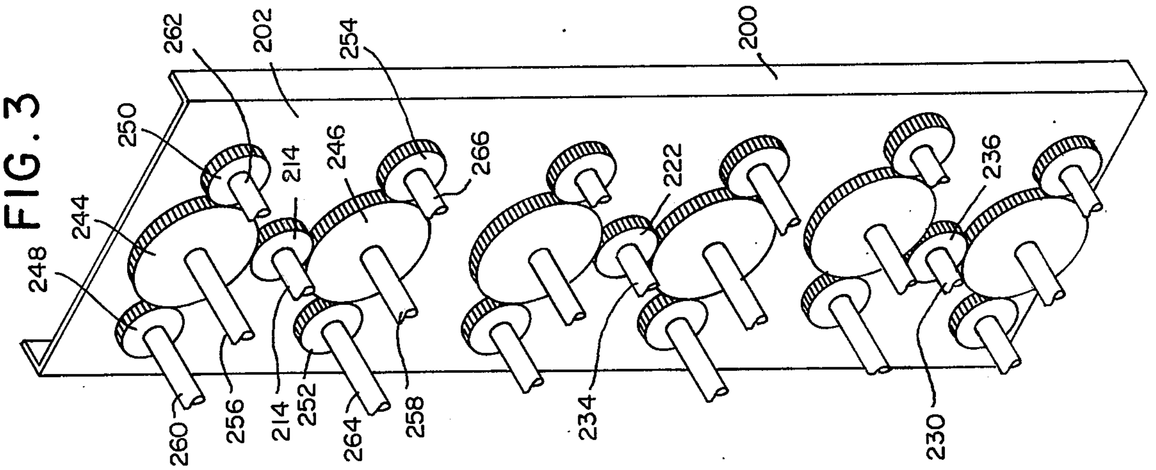
FIG. 3 is a perspective view of the apparatus of FIG. 2.
Figure 2:
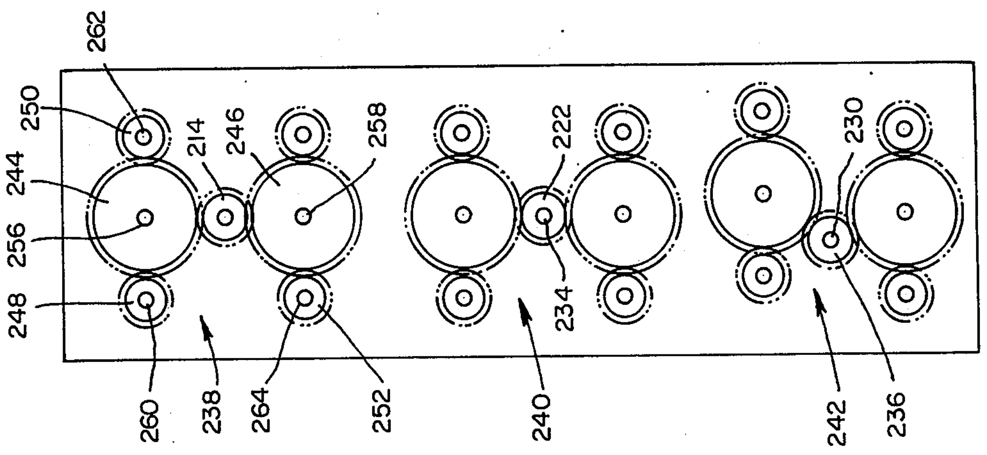
FIG. 2 is a rear elevational view of the gear system of FIG. 1.

As best seen in FIGS. 1 – 3, the basic concept of the present invention will now be described. It will be appreciated that the gear system may be employed for use with any type of equipment wherein it is desired to rotate a plurality of shafts for work producing purposes. The invention may be considered as a power transfer device which acts to provide an efficient means to transfer rotative power between the input and the output.

In the embodiments set forth, a plurality of gears are illustrated and these gears may be fabricated of any suitable material suitable for use with the intended purpose of a work producing apparatus which employs the gear system. The gears may be fabricated of metal or fiber in accordance with present practice and the gears may also be fabricated of various types of plastics. In this latter regard, both solid plastics and hollow, molded plastics have been employed. In one embodiment, plastic gears have been utilized which have been fabricated by blow molding processes. The efficient transfer of the load by utilizing the present gear system has greatly reduced the gear tooth load, thereby making it practical to employ blow molded, hollow, plastic gears in some work applications.

We show in FIGS. 1, 2 and 3, a gear system generally designated 200 which includes a rigid support 202 of sufficient strength to carry the gears and shafts hereinafter set forth. A driving gear 204 receives rotative power from a power source (not shown) such as a motor and rotates in the direction of the arrow 206. The driving gear has its shaft 208 journalled within the support 202 and meshes with a large power gear 210 to rotate the power gear 210 in the direction of the arrow 212. The large power gear fixedly connects to power shaft 214 and rotates the shaft 214 upon the application of rotative power from the driving gear 204.

The large power gear 210 is optionally in direct mesh with a juxtaposed, similar second large power gear 216 or else a reversing gear 218 is interposed therebetween In the embodiment illustrated, the reversing gear 218 acts to rotate the second large power gear 216 in the direction indicated by the arrow 220. The second large power gear 216 fixedly connects to the second power shaft 222 in a manner to rotate the shaft 222 as the gear 216 is rotated.

Similarly, a third juxtaposed, similar large power gear 224 is rotated in the direction of the arrow 226 by rotative power supplied by the large power gear 216 through the reversing gear 228. It will be noted that the third large power gear would rotate in the direction opposite to that indicated by the arrow 226 if the reversing gear 228 were omitted and the large gears 216, 224 were in direct mesh. Rotation of the third large power gear 224 rotates the third power shaft 230 for power transfer purposes in the manner hereinafter more fully set forth.

Referring now to FIG. 2, it will be observed that the third, second and third power shafts 214, 222, 230 each extend through the support 202 a sufficient distance to fixedly respectively receive a small drive gear 232, 234, 236 thereon. Suitable bearings or bushings (not illustrated) are conventionally provided where the shafts 214, 222, 230 pass through the support 202 to permit free rotation thereabout.

Each of the small drive gears powers a modular, similar, satellite gear cluster generally designated respectively 238, 240, 242. The gear clusters are preferably similar in construction but need not necessarily be the same. Each gear cluster comprises a plurality of individual gears which are directly or indirectly rotated by a small drive gear 232, 234 or 236. The individual gears in turn rotate work producing shafts to provide a plurality rotating shafts for a desired purpose, for example, web transporting, mixing, power transmission and the like. It will be appreciated that although three gear clusters 238, 240, 242 are illustrated, more or fewer similar clusters could be employed as may be necessary to provide the desired number of rotating shafts.

It is contemplated that the various gear clusters 238, 240, 242 will be similarly arranged in balanced patterns and accordingly, only one gear cluster 238 need be described in detail, it being understood that the other gear clusters 240, 242 will be similar in design and operation.

A pair of driven gears 244, 246 mesh with the first small drive gear 232 and preferably are diametrically opposed. Each driven gear 244, 246 in turn meshes with a second pair of driven gears 248, 250 and 252, 254 respectively and the second driven gear pairs 248, 250, and 252, 254 are also diametrically opposed. In the embodiment illustrated, when the gears are diametrically opposed, lines connecting the centers of the pairs of second driven gears 248, 250 and 252, 254 will intersect a line drawn through the centers of the driven gears 244, 246 at right angles. Each of the gears 244, 246 and the second pairs of driven gears 248, 250 and 252, 254 are respectively equipped with shafts 256, 258, 260, 262, 264, 266 for work producing purposes. Each of the shafts journals within the support 202 and projects outwardly therefrom to deliver rotative forces to the point of use. The various shafts 256, 258, 260, 262, 264, 266 may be equipped with rollers, mixers, propellers, gears, etc. (all not shown) as may be desired to accomplish a given work producing purpose. The power shafts 214, 222 and 230 may also be extended for work producing purposes, (see FIG. 3), if desired.

In this manner, the large diameter power gears 210, 216, 224 are employed to overcome bearing friction to a large extent. Each satellite gear cluster 238, 240, 242, produces relatively short gear chains having less gear inefficiency. Each of the pairs of driven gears 248, 250 and 252, 254 are positioned at the end of the chain and have no other gear drive function to perform. The short gear chain results in less compounding of leverages and in less bearing loading. The plurality of short gear chains thereby require less power than previously designed, continuous gear chains. The diametrically opposed pairs of driven gears 244, 246, 248, 250 and 252, 254 substantially balance the bearing loading on bearings within each satellite cluster and produce opposed, even pressures on the bearings at 180° apart.

Figure 4:
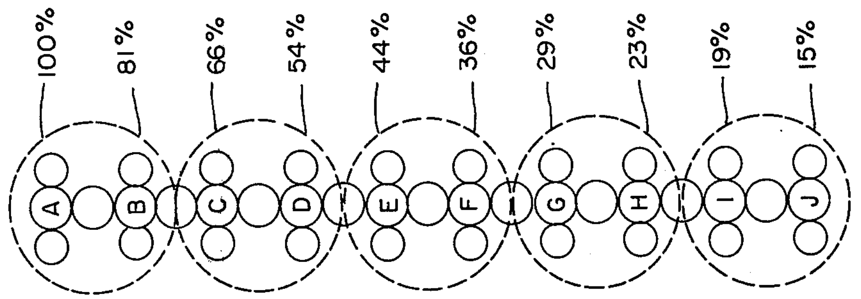
FIG. 4 PRIOR ART
FIG. 4 is a schematic view showing a prior art type of gear arrangement for driving a plurality of shafts.
Figure 5:
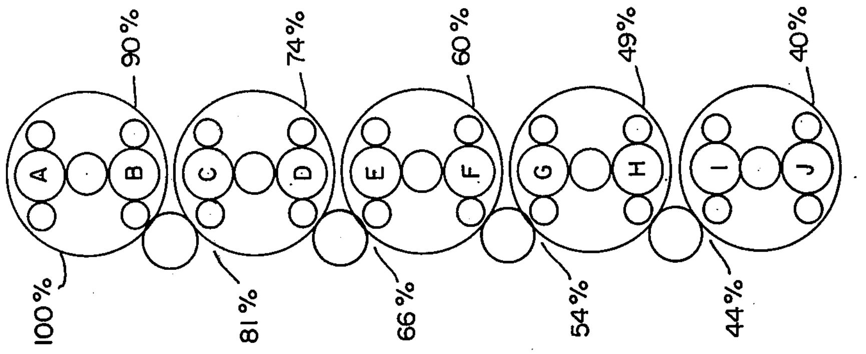
FIG. 5 is a schematic view showing a gear system with the gears arranged in accordance with the present invention to drive the same number of shafts as set forth in FIG. 4.

FIGS. 4 and 5 illustrate schematically the differences in power transmission which may be anticipated from a prior art gear train and a satellite gear cluster system similar to the present invention, when employing an equal number of gears to power an identical work producing load. The sketches are based upon a theoretical ten percent friction loss at each power transfer between gears. It will be observed that the employment of the plurality of satellite gear clusters 238, 240, 242 results in shorter gear trains, thereby substantially reducing the friction loss throughout the system. The satellite cluster arrangement permits gear reducing at each cluster without the necessity of employing idlers. Every roller is positioned at the end of a chain. There is no driving load beyond any roll in the system. By this arrangement, each roller gear has only itself to drive and chatter is minimized.

As illustrated in FIG. 4, a serially arranged gear drive for rotating the roller gears A, B, C, D, E, F, G, H, I, J would result in an 85% power loss throughout the length of the chain, assuming a 10% loss at each power transfer between gears. In contrast to this, as schematically illustrated in FIG. 5, by employing the large power gear arrangement with the satellite gear cluster alignment, the same roller gears with the same loads would theoretically result in only a 60% power loss throughout the system.

It is contemplated that the same principles would be applicable to other types of drive systems for the large power gears other than direct mesh. For example, in FIG. 1A, the large power discs 282, 284, 286 are shown as rotated by an eccentric drive 288 which is driven by a power source (not illustrated) and which is eccentrically connected to the large power discs at the respective pins 290, 292, 294 to rotate the power shafts 283, 285, 287. FIG. 1B illustrates a belt or chain drive 305 which takes power from the drive gear 302 and drive gear shaft 303 and transmits the power directly to the large power gears 296, 298, 300. Suitable conventional tensioning rollers or gears 304, 306 may be employed if desired. In this manner, the power shafts 297, 299 and 301 will all be rotated in unison.

FIG. 1C illustrates a worm drive to simultaneously rotate the large power gears 308, 310, 312 and the associated power shafts 309, 311, 313. The worm drive shaft 314 receives rotative power from a power source (not shown) to rotate the worm gears 315, 316, 317. The worms respectively mesh with the large power gears 308, 310 and 313 for power shaft 309, 311, 313 rotative purposes. In FIG. 1D, another modification is set fourth wherein a power source (not shown) supplies rotative power to the power drive shaft 324. A plurality of miter or bevel gears 326, 328, and 330 are pinned or otherwise affixed to the shaft 324 and are rotated thereby. The bevel gears 326, 328, 330 respectively mesh with the large bevel power gears 318, 320, 322 to rotate the power shafts 319, 321 and 323.

The following chart illustrates the comparative advantages and disadvantages between various types of prior art drive systems and the systems illustrated in FIG. 1, 1A, 1B, 1C and 1D:

| Applicant's Drive System | Prior Art Type of Drive System | Chatter | Stretching and Distortion From Operation | Critical Adjustment | High Cost of Manufacture | Wear | Practicality for Long Drive Chain |
|---|---|---|---|---|---|---|---|
| | Chain | A | A | No | No | A | Yes |
| | Belt (direct) | A | A | No | No | A | Yes |
| | Worm (direct) | No | No | A | A | A | A |
| | Cone Shaft (direct) | A | No | A | A | A | A |
| | Gear (conventional) | A | No | No | No | A | A |
| | Eccentric (direct) | No | No | A | A | No | A |
| Direct Gear (FIG. 1) | | No | No | No | No | No | Yes |
| Eccentric (FIG. 1A) | | No | No | B | B | C | C |
| Chain or belt (FIG. 1B) | | No | A | No | No | No | Yes |
| Worm (FIG. 1C) | | No | No | B | B | B | A |
| Cone or Bevel (FIG. 1D) | | No | No | B | B | B | A |

A — designates a detrimental system condition.
B — designates a system condition that is less than usually found in a conventional system.
C — designates a system condition that is better than usually found in a conventional system.

Referring now to FIGS. 6 – 9, we show the invention as applied to a roller assembly 10 suitable for conveying a web 15 such as a film and which includes a right side carrier 12, a left side carrier 14 and a web transporting roller system which is rotatively journalled therebetween. The roller assembly includes a plurality of rollers suitably positioned to transport the web 15 downwardly through a vertically elongated path between pairs of rollers 50, 51; 42, 44; 94, 86; 96, 88; 110, 112; 114, 116; 18, 112; 122, 124; through the turnabout rollers 126, 128, 130, 132, and then upwardly between the roller pairs, 134, 136; 138, 140; 114, 142; 110, 144; 96, 146; 94, 148; 42, 150; and 152, 154. A set of fixed web guides 52 are provided in conventional manner to further define the web path. Thus the web 15 is conveyed in the direction of the arrows 21, 23 (FIG. 9) by the various pairs of rollers. Quite often, the roller assembly 10 is immersed in a chemical containing liquid (the liquid level being schematically indicated at 75). Because of this, the component parts such as the guides 52, side carriers 12, 14 and the gears and rollers are usually made of materials resistive to the corrosive effects of the liquid. Additionally, the exact positioning of the rollers and gears has not been illustrated in detail inasmuch as such details form no part of the present invention.

Figure 6:
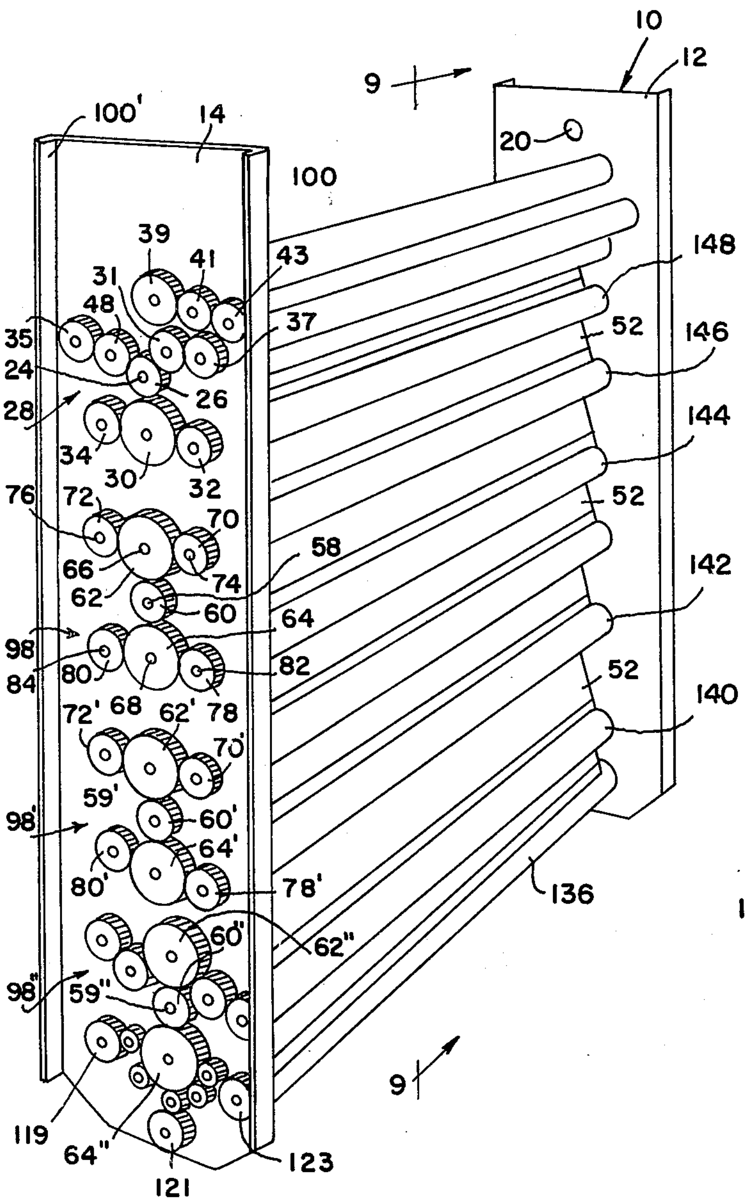
FIG. 6 is a perspective view of a web transporting roller assembly incorporating the gear drive system of the present invention.
Figure 7:
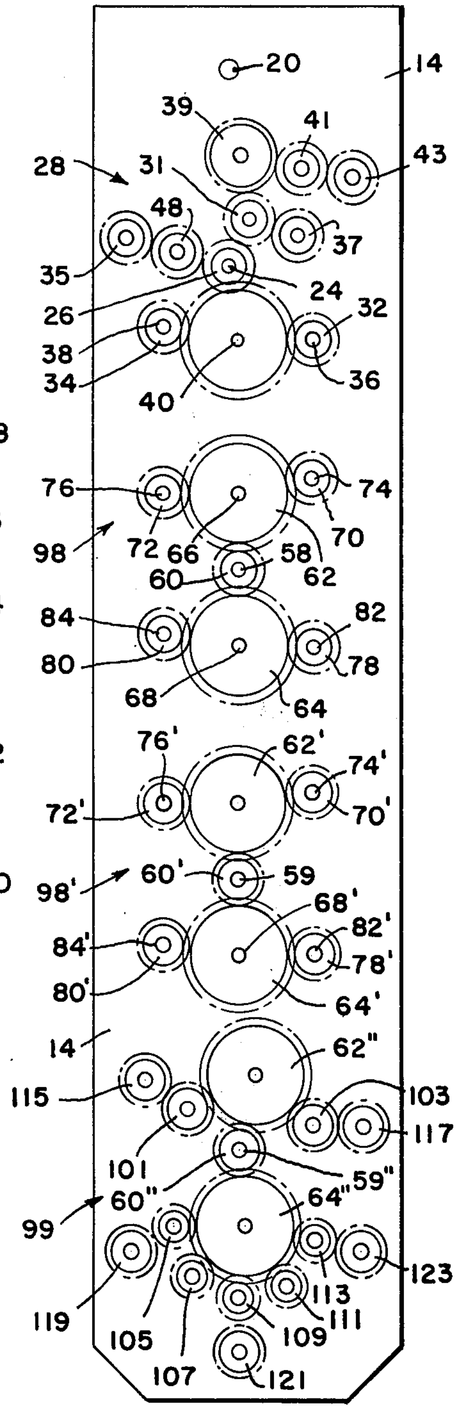
FIG. 7 is an enlarged, left side elevational view of the roller assembly of FIG. 6.
Figure 8:
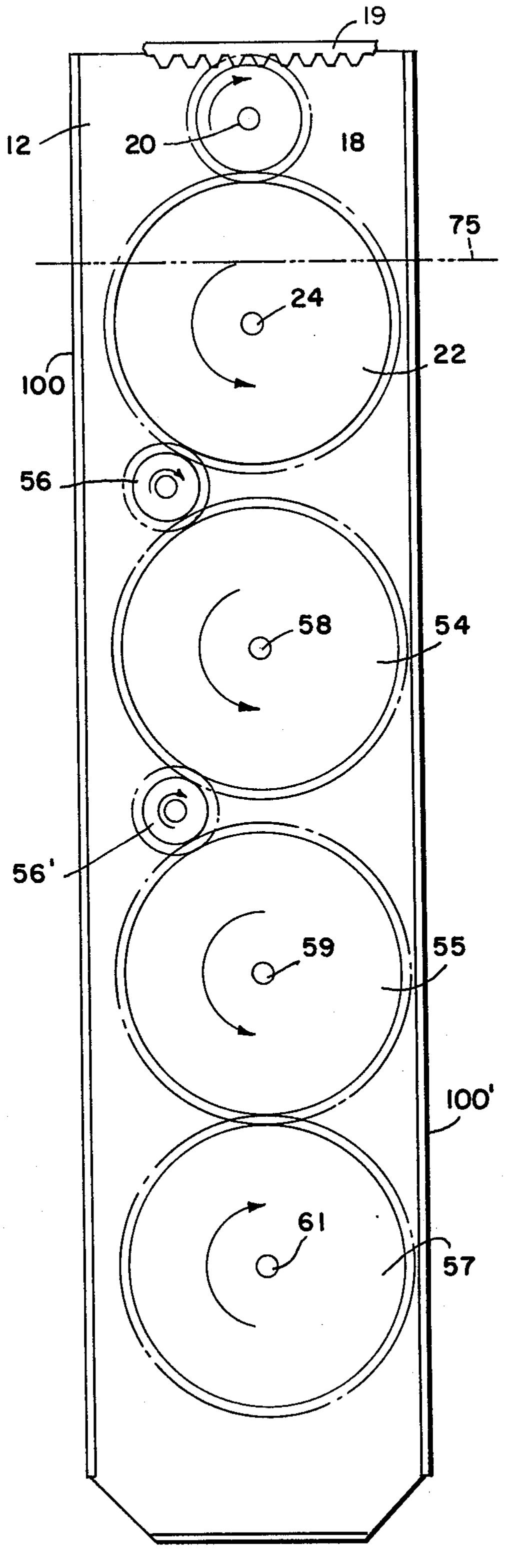
FIG. 8 is an enlarged, right side elevational view of the roller assembly of FIG. 6.

Referring now to FIGS. 6, 7 and 8, the construction and operation of a single segment of the gear drive system of the present invention as applied, for example, to a roller assembly 10, will now be described. A drive gear 18 powers the entire gear system through energy supplied by a power source, for example, an electric motor (not shown), which is conventionally applied to the drive gear 18 in a well known manner, such as by a toothed belt drive 19. The drive gear 18 rotates about its side carrier journalled shaft 20 and meshes with the uppermost large power gear 22 to rotate the large power gear 22 when the drive gear 18 is rotated. Preferably, the drive gear 18 is constructed with forty teeth and the large power gear 22 is fabricated with 80 teeth to rotate the uppermost large power gear 22 at a rate of speed which is half the rotational speed of the drive gear 18. The drive gear 18 sequentially drives the vertically spaced large, similar power gears 22, 54, 55 and 57. Reversing gears 56, 56′ are provided where needed, in well known manner, to rotate the lower positioned, large power gears 54, 55, 57 in the desired direction.

The large power gear 22 is pinned or otherwise securely affixed to the power shaft 24 to rotate the power shaft 24 as theuppermost large power gear itself is rotated. The power shaft 24 is journalled within the right and left side carriers 12, 14 and extends outwardly from the side carriers 12, 14 a sufficient distance to accommodate the uppermost large power gear 22 at the right of the right side carrier 12 and the uppermost small drive gear 26 at the left of the left side carrier 14. The uppermost small drive gear 26 is conventionally affixed to the power shaft 24 and rotates in unison with the uppermost large power gear 22. Rotary power from the large gear 22 is transmitted to the uppermost small drive gear 26 so that the small drive gear 26 becomes the driving gear for the upper gear satellite system 28. The uppermost small drive gear 26 is preferably fabricated with 16 teeth to thereby provide a five to one ratio with the 80 tooth, uppermost large power gear 22. It will be noted (FIG. 9) that the power shaft 24 does not directly attach to any roller and that it is centrally positioned within the rack assembly 10 so as not to interfere with the movement of the web 15 therethrough.

An intermediate driven gear 30 meshes with the uppermost small drive gear 26 and in turn drives the diametrically opposed roller drive gears 32, 34. The roller drive gears 32, 34 rotate their respective shafts 36, 38 and the intermediate driven gear 30 rotates its shaft 40 in response to power supplied by the uppermost large power gear 22. The respective shafts 40 and 36, 38 each have rollers 42, 150, 44 affixed and in turn cause rotation of the shaft affixed large medial roller 42 and the diametrically opposed small feed rollers 150, 44. Preferably, the small roller drive gears 32, 34 are fabricated with 16 teeth and accordingly, the small roller drive gears 32, 34 will rotate at the same speed as the uppermost small drive gear 26 inasmuch as all three gears have the same number of teeth and all are in mesh with the intermediate driven gear 30. Thus, the respective web transporting rollers 42, 44 are rotated in unison and at the same speed.

As illustrated, the upper gear satellite system 28 may include a plurality of auxillary gears 48, 35, 26, 37, 39, 31, 41, 43 which conventionally rotate their shafts and which are employed to function such auxillary rollers 50, 51, 152, 154, 156 as may be required or desirable to properly guide a material web 15 automatically into and out of the roller assembly 10. The auxillary gears 48, 31 mesh with the uppermost small drive gear 26 to drive the gears 35, 37, 39, 41, 43 in accordance with well known gear train design principles in a manner to simultaneously rotate all of the auxillary rollers 50, 51, 152, 154, 156 when power is supplied to the uppermost small drive gear 26. Suitable interior guides 52 are conventionally strategically positioned throughout the roller assembly 10 to function in conjunction with the rollers to automatically guide the material web 15 between the rollers to permit automatic operation without the occurrence of jams, buckling or other web handling defects.

Referring now to FIGS. 7 and 8, it will be seen that the gear and roller systems previously described at the upper portion of the roller assembly 10 can be duplicated in a similar manner as many times as may be necessary for proper web handling within the roller assembly. A next lower positioned large power gear 54 receives rotative power from the drive gear 18 through the uppermost large power gear 22 and a reversing gear 56. When it is desired to rotate the upper two medial rollers 42, 94 in the same direction, the reversing gear 56 can be employed. As illustrated, the next lower positioned large power gear 54 meshes with the reversing gear 56 to rotate in unison with the uppermost large power gear 22 and in the same direction. The next lower positioned large power gear 54 rotates its shaft 58 to cause rotation of the next lower positioned small drive gear 60 which is positioned adjacent the other side carrier 14 and which is affixed to the shaft 58. The next lower positioned small drive gear 60 meshes with the upper and lower intermediate driven gears 62, 64 to rotate these gears and their respective shafts 66, 68.

Figure 9:
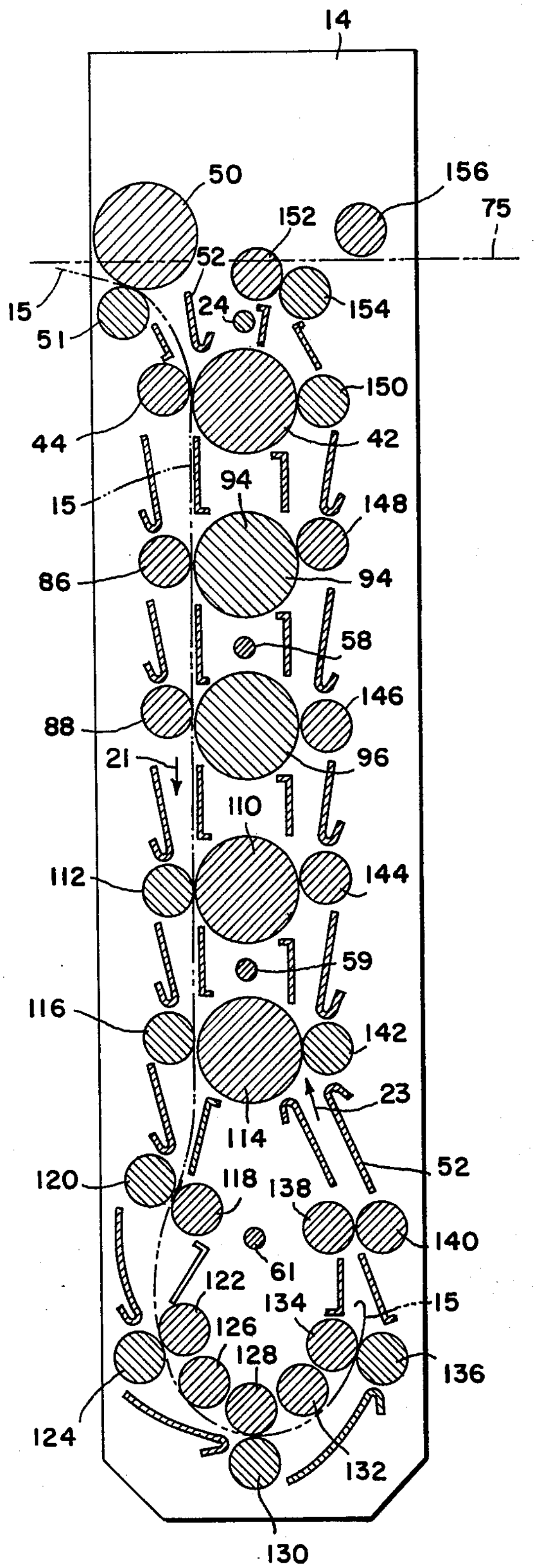
FIG. 9 is a cross sectional view taken along Line 9—9 of FIG. 6, looking in the direction of the arrows.

The upper intermediate driven gear 62 meshes with right and left roller drive gears 70, 72 which in turn rotate their respective associated shafts 74, 76. In this manner, the rollers 94, 148, 86 are simultaneously rotated. Similarly, the next lower positioned small drive gear 60 meshes with the lower intermediate driven gear 64 to rotate the gear 64 and its shaft 68. Right and left roller drive gears 78, 80 mesh with the lower intermediate driven gear 64 and are rotated thereby to rotate their respective roller shafts 82, 84. Rotation of the respective roller shafts 68, and 82, 84 causes simultaneous rotation of the small feed roller 88, small exit roller 146 and the medial roller 96. (FIG. 9). Thus, the combination of the gears 62, 64, 70, 72 and 78, 80 which all receive power from the lower positioned drive gear 60 form the second gear satellite cluster 98 which is similar in function and design to the upper gear satellite cluster 28. Similarly, additional, lower positioned satellite gear cluster 98′, can be developed by employing power from the same drive gear 18 simply by adding additional, lower positioned large power gears 55 (FIG. 8), and additional reversing gears 56′ if desired to rotate respective lower positioned power shafts 59. It will be noted that no reversing gear 56′ is employed between the large power gears 55 and 57 in the configuration illustrated in FIG. 8. Accordingly, the lowest large power gear 57 will rotate in the opposite direction from the direction of rotation of the large power gear 55.

In accordance with the present design, only four large power gears 22, 54, 55 and 57 are employed and driven directly by the power drive gear 18. Each of the large power gears 22, 54, 55 and 57 in turn breaks down the forces required into distinct and separate satellite gear clusters 28, 98, 98′, 99. See FIG. 7. Accordingly, instead of a large continuous gear to gear train to rotate the rollers in accordance with usual gear train design techniques, wherein all of the gears 26, 30, 31, 32, 34, 35, 37, 39, 41, 43, 48, 60, 60′, 62, 62′, 64, 64′, 70, 70′, 72, 72′, 78, 78′, 80, 80′, 101, 103, 105, 107, 109, 111, 113, 117, 119, 121 and 123 were conventionally, sequentially driven off of a common drive, the present design makes possible a simplified gear drive system which functions under greatly reduced power requirements. The present design always employs the same gear cluster pattern wherein a large power gear 22, 54, 55 or 57 at one side carrier 12 is employed to rotate a small drive gear 26, 60, 60′, 60″ at the other side carrier 14 through a power shaft 24, 58, 59, 61. In turn, each small drive gear 24, 60, 60′, 60″ is employed to rotate one or more larger intermediate driven gears 30, 62, 62′, 62″, 64, 64′, 64″ to thereby create separate and complete gear satellite clusters 28, 98, 98′, 99. By designing the number of teeth in the large power gear of relatively large number, for example, eighty, and designing the number of teeth in the roller gears 32, 34, 70, 70′, 72, 72′, 78, 78′, 80, 80′ of relatively small number of teeth, for example, 16, the roller gears will have a five-to-one ratio with the power gears. The power take up force will then have a ratio of five to one at each of the satellite gear clusters 28, 98, 98′, 99 to thereby reduce power requirements.

Each of the intermediate positioned drive gears 60, 60′ has clustered thereabout a plurality of gears associated directly and indirectly to drive the rollers of the film processing rack 10. The middle gear clusters 98, 98′ are typical and indicate a preferred repeat design whereby the film processing rack 10 can readily be made larger or smaller by adding or subtracting satellite gear clusters 98, 98′ and their associated large power gears 54, 55 and power shafts 58, 59. As best seen in FIGS. 6 and 7, the drive gear 26 which is affixed to the upper power shaft 24 of the uppermost large power gear 22 is the power source to the upper gear cluster 28. The drive gear 26 meshes directly with the roller gears 31, 48, 30 and indirectly with the roller gears 32, 34, 35, 37, 41 and 43. The gear 39 is not employed to rotate a roller, but rather is present to power the gear 43 and to allow correct positioning of the roller 156 to facilitate automatic movement of the web 15. The roller 50 as illustrated is rotated by frictional contact with the roller 51 in conventional manner and need not be gear driven. The various rollers have been positioned for optimum film handling purposes. The gearing to rotate the rollers has been designed in accordance with the present invention to be arranged into the various satellite gear clusters. Thus, at the top of the rack assembly, all of the web feed rollers and web exit rollers are driven by the satellite gear clusters 28 through the uppermost large power gear 22.

The lowermost large power gear 57 through its power drive shaft 61 powers the lowermost satellite gear cluster 99 which is designed to function all of the rollers associated with turning the web at the bottom of the rack assembly 10 and then reversing the path of web travel. The lowermost drive gear 60″ is turned by the power shaft 61 and meshes with the large gears 62″, 64″ which in turn directly drive the small roller gears 101, 103, 105, 107, 109, 111 and 113 and indirectly drive the roller gears 115, 117, 119, 121 and 123. Such an arrangement may be employed for web turnabout purposes. It will be appreciated that the lowermost satellite gear cluster 99 represents only one method of turning a web and that the invention is not so limited. The web turning system may be modified by those skilled in the art to include many different roller designs and still come within the scope and meaning of this invention.

The intermediate large power gear 54 rotates its affixed power shaft 58 to thereby rotate the power gear 60′ which is also affixed to the power shaft 58 and the satellite gear cluster 98. Rotation of the power gear 60′ causes rotation of the rollers 86, 94, 148 and 88, 96, 146 about their respective shafts 76, 66, 74 and 84, 68 and 82. The next lower intermediate large power gear 55 rotates its affixed power shaft 59 to thereby rotate the power gear 60′ which is also affixed to the power shaft 59. The power gear 60′ causes rotation of the rollers 112, 110, 144 and 116, 114, 142 about their respective shafts 76′, 66′, 74′ and 84′, 68′ and 82′. The satellite gear clusters 98, 98′ which are associated with the large power gears 54, 55 are substantially identical for all practical purposes. Thus, the height of the rack assembly 10 can be readily varied by either adding or subtracting one or more satellite gear clusters such as 98, 98′ and their associated large power gears 54, 55 and power shafts 58, 59.

The entire force required to rotate all of the gears and rollers is applied only to the uppermost large power gear 22 through the drive gear 18. All of the power gears 22, 54, 55, 57 are large gears and occupy essentially the entire front to rear width of the right and left side carriers 12, 14 between the flanges 100, 100′. Thus, the largest dimension of the large power gears is regulated by the width of the side carriers.

Additionally, it has been found that the tendency to produce chatter or vibration in the gear system can be eliminated by employing the five to one ratio between the large gears and the small gears. It will be noted that the distance between teeth on a large 80 tooth power gear 22, 54, 55, 57 will be 3/16 of an inch. When the power forces are transmitted from the right side carrier 12 to the left side carrier 14 by means of the power shafts 24, 58, 59, 61 the rotative forces are transmitted to the small roller gears 32, 34, 70, 70′, 72, 72′, 78, 78′, 80, 80′ all of which are designed with 16 teeth. Thus, the clearance possible at the left side carrier will be only 1/5 of 3/16 of an inch, or a clearance of only 3/80 of an inch at the small gears. This five to one reduction in forces and clearance between the large power gears and small roller gears acts to substantially eliminate chatter.

Although we have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited to the foregoing specification but rather only by the scope of the claims appended hereto.

We claim:

1. In an improved gear system of greater efficiency, less bearing loading and less power requirement, having a multiplicity of gears vertically mounted in a rack and connected to rotate respective work-producing shafts, said rack including at least one side carrier, the improvement in the gear system which comprises:

a plurality of large power gears positioned vertically one above the other along the side carrier;

a plurality of cluster drive gears of a smaller diameter than the power gears, the cluster drive gears being coaxially rotated by respective power gears at the same rate of rotation;

a plurality of clusters of a plurality of gears, said gears being positioned to be driven by the cluster drive gears, at least some driven gears being connected to rotate the work-producing shafts, the difference in diameter between the large power gear and the cluster drive gear which is coaxially rotated by the respective power gear providing a multiplication of forces from each one of the power gear to each one of cluster drive gear which is rotated by the respective power gear.

2. The gear system of claim 1 wherein the large power gears and the satellite gear clusters are mounted in the same support.

3. The gear system of claim 1 wherein the large power gears are mounted on a first support and the satellite gear clusters are mounted on a second support, the first and second supports being spaced apart.

4. The gear system of claim 3 wherein the power gears are connected to the respective cluster drive gears by power shafts which extend between the first support and the second support.

5. The gear system of claim 1 wherein the gears of the satellite gear clusters rotate in unison upon function of the drive means thereby providing uniform rotation of the work-producing shafts.

6. The gear system of claim 1 wherein said driven gears of a cluster include a pair of gears directly driven by cluster drive gears, which is in mesh with the cluster drive gear.

7. The gear system of claim 6 wherein the gears driven directly by the cluster drive gears are mounted in diametrically opposed relation to the cluster drive gear.

8. The gear system of claim 7 wherein said driven gears include a pair of gears driven indirectly by the cluster drive gear, said indirectly driven gears being in mesh with one of the directly driven gears.

9. The gear system of claim 8 wherein said directly driven gears are mounted in diametrically opposed relation to one of the gears driven by the cluster drive gears.

10. The gear system of claim 9 which includes a pair of diametrically positioned gears driven by the cluster drive gears and a pair of indirectly driven cluster driven gears diametrically positioned with respect to each directly driven gear.

11. The gear system of claim 1 wherein the plurality of driven gears position about the drive gear to impose balanced loads on the drive gear.

12. The gear system of claim 11 wherein a pair of directly driven gears mesh with the driving gear, said directly driven gears imposing loads on the drive gear that are directed 180° apart.

13. The gear system of claim 12 and a pair of indirectly driven gears in mesh with each gear driven by the cluster drive gear, said pair of indirectly driven gears imposing loads on their associated directly driven gear that are directed 180° apart.

14. The gear system of claim 13 and work producing shafts connected to at least some of the gears driven by the cluster drive gear, said shafts being rotated by the driven gears.

15. The gear system of claim 14 and rollers carried by the work producing shafts which are driven by the cluster drive gear, said rollers being rotated by the said shafts for work producing purposes.

16. The gear system of claim 1 wherein two side carriers are positioned in spaced relationship, the large power gears being mounted adjacent one side carrier and the cluster drive gears and clusters of driven gears being mounted adjacent the other side carrier and drive shafts extending between the side carriers.

17. The gear system of claim 1 wherein the diameter of at least some of the power gears is about five times the diameter of the respective cluster drive gears rotated thereby.

18. The gear system of claim 1 wherein there are more than two power gears.

19. The gear system of claim 1 wherein there are more than three power gears.

20. The gear system of claim 1 wherein there are more than four power gears.

21. The gear system of claim 19 wherein the cluster drive gears each drive two driven gears.

22. The gear system of claim 19 wherein the cluster drive gear is smaller in diameter than at least one of the gears it drives.

23. The gear system of claim 19 wherein at least two cluster drive gears drive at least two cluster driven gears, which in turn drive at least two driven gears.

24. The gear system of claim 1 wherein there are more than five power gears.

25. The gear system of claim 1 comprising at least one reversing gear.

26. The gear system of claim 25 wherein the reversing gear is between two consecutive power gears.

27. The gear system of claim 1 wherein the power gears drive one another.

28. The gear system of claim 1 which includes means which drives the power gears simultaneously and which are rotatable in a plane substantially parallel to the plane of rotation of the power gears.

29. The gear system of claim 28 wherein the power gears are spur gears.

30. The gear system of claim 29 wherein the means which drives the power gears drives one of the power gear, which in turn drives the other power gears, thereby supplying the force required to drive the power gear train from that one power gear.

31. The gear system of claim 28 wherein at least one cluster has no gear meshing with any gear of any other cluster.

32. The gear system of claim 28 wherein none of the cluster drive gear are in direct meshing relationship with another cluster drive gear.

33. The gear system of claim 28 wherein each power transmitting gear is connected to a cluster drive gear.

34. The gear system of claim 28 wherein each one of the cluster drive gear is of a smaller diameter than the respective large power drive gear.

35. The gear system of claim 28 which includes at least three power gears each coaxially rotating a smaller cluster drive gear, each cluster drive gear driving each two driven gears.

36. The gear system of claim 28 which includes at least one gear driven by one of the driven gears.

37. The gear system of claim 27 wherein the power gears which drive one another are meshed in series.

38. The gear system of claim 37 which comprises a reversing gear positioned between two power gears which rotate in the same direction.

39. The gear system of claim 38 wherein two power gears and the reversing gear positioned between them are spur gears meshed in series.

* * * * *

UNITED STATES PATENT AND TRADEMARK OFFICE
CERTIFICATE OF CORRECTION

PATENT NO. : 3,952,610

DATED : April 27, 1976

INVENTOR(S) : Henry F. Hope and Stephen F. Hope

It is certified that error appears in the above-identified patent and that said Letters Patent are hereby corrected as shown below:

Entry [56] should read as follows:

[56] References Cited
UNITED STATES PATENTS

| | | | |
|---|---|---|---|
| 3,151,502 | 10/1964 | Kron et al | 74/421 R |
| 3,841,216 | 10/1974 | Huffman | 101/181 |
| 3,847,079 | 11/1974 | Dahlgren | 101/216 X |
| 3,520,461 | 7/1970 | Savela | 226/188 |
| 3,785,543 | 1/1974 | Lee | 226/188 |
| 1,769,957 | 7/1930 | Krotee | 74/397 XX |
| 2,687,090 | 8/1954 | Carroll | 101/227 |
| 2,794,389 | 6/1957 | Halley | 101/219 |
| 2,817,514 | 12/1957 | Parkes | 271/2.3 |
| 2,859,627 | 11/1958 | Gallop, Jr | 74/16 |
| 3,073,590 | 1/1963 | Romeo | 271/51 |
| 3,078,024 | 2/1963 | Sardeson | 226/119 |
| 3,191,531 | 6/1965 | Worthington | 101/219 |
| 3,286,852 | 11/1966 | Haulotte | 212/38 |
| 3,299,685 | 7/1967 | Kocks et al | 72/249 |
| 3,366,025 | 1/1968 | Layne | 95/94 |
| 3,435,749 | 4/1969 | Cauwe et al | 95/94 |
| 616,092 | 12/1898 | Eynon et al | 72/14 |
| 652,765 | 7/1900 | Firm | 270/6 |
| 707,100 | 8/1902 | Goss | 270/5 |
| 1,240,009 | 9/1917 | Bechman | 270/5 |
| 1,368,258 | 2/1921 | Holtham | 101/351 |
| 1,640,977 | 8/1927 | Brueshaber | 270/5 |
| 1,921,443 | 8/1933 | Tomlin | 101/219 |
| 2,025,927 | 12/1935 | Wood | 270/5 |
| 2,297,005 | 9/1942 | Livingston | 101/219 |
| 2,462,032 | 2/1949 | Wolf | 270/5 |

UNITED STATES PATENT AND TRADEMARK OFFICE

CERTIFICATE OF CORRECTION

PATENT NO. : 3,952,610

DATED : April 27, 1976

INVENTOR(S) : Henry F. Hope and Stephen F. Hope

It is certified that error appears in the above-identified patent and that said Letters Patent are hereby corrected as shown below:

FOREIGN PATENTS 736,265 6/1943 Germany Dahlke........354/297

Signed and Sealed this

Seventh Day of September 1976

[SEAL]

*Attest:*

RUTH C. MASON
*Attesting Officer*

C. MARSHALL DANN
*Commissioner of Patents and Trademarks*